United States Patent
Kim et al.

(10) Patent No.: US 10,758,898 B2
(45) Date of Patent: Sep. 1, 2020

(54) METHOD FOR MANUFACTURING CARBON NANOTUBE AGGLOMERATE HAVING CONTROLLED BULK DENSITY

(71) Applicant: LG CHEM, LTD., Seoul (KR)

(72) Inventors: SungJin Kim, Daejeon (KR); Jihee Woo, Daejeon (KR); Dongchul Lee, Daejeon (KR); Seungyong Son, Daejeon (KR); KwangWoo Yoon, Daejeon (KR); Seungyong Lee, Daejeon (KR); Eugene Oh, Daejeon (KR); Jinmyung Cha, Daejeon (KR); Hyun Woo Park, Daejeon (KR); Hyungsik Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 575 days.

(21) Appl. No.: 14/914,462

(22) PCT Filed: Jun. 8, 2015

(86) PCT No.: PCT/KR2015/005704
§ 371 (c)(1),
(2) Date: Feb. 25, 2016

(87) PCT Pub. No.: WO2015/190774
PCT Pub. Date: Dec. 17, 2015

(65) Prior Publication Data
US 2016/0214863 A1    Jul. 28, 2016

(30) Foreign Application Priority Data
Jun. 12, 2014    (KR) .................. 10-2014-0071184

(51) Int. Cl.
*B32B 9/00*    (2006.01)
*B01J 37/02*    (2006.01)
(Continued)

(52) U.S. Cl.
CPC ......... *B01J 37/0236* (2013.01); *B01J 23/745* (2013.01); *B01J 23/75* (2013.01);
(Continued)

(58) Field of Classification Search
CPC ................. Y10T 428/30; C01B 31/022–0293
(Continued)

(56) References Cited

U.S. PATENT DOCUMENTS

| 7,754,181 B2 * | 7/2010 | Silvy ....................... B01J 23/75 |
| | | 423/447.1 |
| 2008/0213160 A1 | 9/2008 | Silvy et al. |

(Continued)

FOREIGN PATENT DOCUMENTS

| JP | 2008-525168 A | 7/2008 |
| JP | 2011-148674 A | 8/2011 |

(Continued)

OTHER PUBLICATIONS

Fazle Kibria, et al.: "Synthesis of carbon nanotubes over nickel-iron catalysts supported on alumina under controlled conditions", XP008128751, Catalysis Letters, Plenum Publishing Corporation, vol. 71, No. 3-4, Jan. 1, 2001, pp. 229-236.

*Primary Examiner* — Daniel H Miller
(74) *Attorney, Agent, or Firm* — Dentons US LLP

(57) ABSTRACT

The present invention relates to a supported catalyst that can be used to produce a carbon nanotube aggregate with high bulk density, a method for preparing the supported catalyst, a carbon nanotube aggregate produced using the supported catalyst, and a method for producing the carbon nanotube aggregate. According to the present invention, the bulk density of the carbon nanotube aggregate is easily controllable. Therefore, the carbon nanotube aggregate is suitable for use in various fields.

15 Claims, 2 Drawing Sheets

(51) Int. Cl.
*B01J 23/745* (2006.01)
*B01J 23/847* (2006.01)
*B01J 23/882* (2006.01)
*B01J 23/887* (2006.01)
*B01J 23/75* (2006.01)
*B01J 23/881* (2006.01)
*C01B 32/162* (2017.01)
*B01J 35/02* (2006.01)
*B01J 37/08* (2006.01)
*B01J 37/10* (2006.01)
*B01J 21/18* (2006.01)

(52) U.S. Cl.
CPC ......... *B01J 23/8472* (2013.01); *B01J 23/881* (2013.01); *B01J 23/882* (2013.01); *B01J 23/8877* (2013.01); *B01J 35/023* (2013.01); *B01J 37/0207* (2013.01); *B01J 37/088* (2013.01); *C01B 32/162* (2017.08); *B01J 21/185* (2013.01); *B01J 37/10* (2013.01)

(58) Field of Classification Search
USPC ........................................ 428/408; 423/447.1
See application file for complete search history.

(56) References Cited

U.S. PATENT DOCUMENTS

| | | |
|---|---|---|
| 2013/0207026 A1 | 8/2013 | Kim et al. |
| 2014/0255698 A1 | 9/2014 | Kang et al. |
| 2014/0328744 A1 | 11/2014 | Kang et al. |

FOREIGN PATENT DOCUMENTS

| | | |
|---|---|---|
| KR | 10-2012-0092204 B1 | 8/2012 |
| KR | 10-2013-0078926 B1 | 7/2013 |
| WO | 2013/105779 A1 | 7/2013 |
| WO | 2013/105784 A1 | 7/2013 |

* cited by examiner

METHOD FOR MANUFACTURING CARBON NANOTUBE AGGLOMERATE HAVING CONTROLLED BULK DENSITY

This application is a National Stage Entry of International Application No. PCT/KR2015/005704, filed on Jun. 8, 2015, and claims the benefit of and priority to Korean Patent Application No. 10-2014-0071184, filed on Jun. 12, 2014, the entire disclosure both of which are incorporated herein by reference in their entirety for all purposes as if fully set forth herein.

BACKGROUND OF THE INVENTION

1. Field of the Invention

The present invention relates to a supported catalyst, a method for preparing the supported catalyst, a carbon nanotube aggregate produced using the supported catalyst, and a method for producing the carbon nanotube aggregate.

2. Description of the Related Art

Carbon nanostructures (CNSs) refer collectively to nano-sized carbon structures having various shapes, such as nanotubes, nanohairs, fullerenes, nanocones, nanohorns, and nanorods. Carbon nanostructures can be widely utilized in a variety of technological applications because they possess excellent characteristics.

Particularly, carbon nanotubes (CNTs) are tubular materials consisting of carbon atoms arranged in a hexagonal pattern and have a diameter of approximately 1 to 100 nm. Carbon nanotubes exhibit insulating, conducting or semiconducting properties depending on their inherent chirality. Carbon nanotubes have a structure in which carbon atoms are strongly covalently bonded to each other. Due to this structure, Carbon nanotubes have a tensile strength approximately 100 times that of steel, are highly flexible and elastic, and are chemically stable.

Carbon nanotubes are divided into three types: single-walled carbon nanotubes (SW carbon nanotubes) consisting of a single sheet and having a diameter of about 1 nm; double-walled carbon nanotubes (DW carbon nanotubes) consisting of two sheets and having a diameter of about 1.4 to about 3 nm; and multi-walled carbon nanotubes (MW carbon nanotubes) consisting of three or more sheets and having a diameter of about 5 to about 100 nm.

Carbon nanotubes are being investigated for their commercialization and application in various industrial fields, for example, aerospace, fuel cell, composite material, biotechnology, pharmaceutical, electrical/electronic, and semiconductor industries, due to their high chemical stability, flexibility, and elasticity. However, carbon nanotubes have a limitation in directly controlling the diameter and length to industrially applicable dimensions for practical use owing to their primary structure. Accordingly, the industrial application and use of carbon nanotubes are limited despite their excellent physical properties.

Carbon nanotubes are generally produced by various techniques, such as arc discharge, laser ablation, and chemical vapor deposition. However, arc discharge and laser ablation are not appropriate for mass production of carbon nanotubes and require high arc production costs or expensive laser equipment. Chemical vapor deposition using a vapor dispersion catalyst has the problems of a very low synthesis rate and too small a size of final carbon nanotube particles. Chemical vapor deposition using a substrate-supported catalyst suffers from very low efficiency in the utilization of a reactor space, thus being inappropriate for mass production of carbon nanotubes. Thus, studies on catalysts and reaction conditions for chemical vapor deposition are currently underway to increase the yield of carbon nanotubes.

Catalytically active components of the catalysts usually take the form of oxides, partially or completely reduced products, or hydroxides. The catalysts may be, for example, supported catalysts or coprecipitated catalysts, which can be commonly used for carbon nanotube production. Supported catalysts are preferably used for the following reasons: supported catalysts have a higher inherent bulk density than coprecipitated catalysts; unlike coprecipitated catalysts, supported catalysts produce a small amount of a fine powder with a size of 10 microns or less, which reduces the possibility of occurrence of a fine powder due to attrition during fluidization; and high mechanical strength of supported catalysts effectively stabilizes the operation of reactors.

There also exists a need for carbon nanotubes that have a small diameter and can be readily dispersed in and mixed with polymers during compounding with the polymers to obtain composite materials with improved physical properties.

SUMMARY OF THE INVENTION

It is an object of the present invention to provide a supported catalyst for producing bundle type carbon nanotubes in high yield that have a high bulk density and are readily dispersible in and miscible with polymers during compounding with the polymers.

It is a further object of the present invention to provide a carbon nanotube aggregate obtained using the supported catalyst.

It is another object of the present invention to provide a composite material including the carbon nanotube aggregate.

It is another object of the present invention to provide a method for preparing the supported catalyst.

It is still another object of the present invention to provide a method for producing the carbon nanotube aggregate.

One aspect of the present invention provides a supported catalyst that is prepared by mixing a support with an aqueous solution of a graphitization metal catalyst precursor to form a paste, drying the paste such that the water removal rate is from 5 to 30% by weight, and calcining the dried paste wherein the water removal rate is defined by Expression 1:

$$\text{Water removal rate} = \{[(\text{the weight of the support} + \text{the weight of the metal catalyst precursor}) - \text{the weight of the paste after drying}]/(\text{the weight of the support} + \text{the weight of the metal catalyst precursor})\} \times 100 \quad (1)$$

where the weight of the metal catalyst precursor is determined by subtracting the weight of the water solvent from the weight of the aqueous solution of the metal catalyst precursor.

A further aspect of the present invention provides a carbon nanotube aggregate including the supported catalyst and carbon nanotubes grown on the supported catalyst.

Another aspect of the present invention provides a composite material including the carbon nanotube aggregate.

Another aspect of the present invention provides a method for preparing a supported catalyst, including: mixing a support with an aqueous solution of a graphitization metal catalyst precursor to form a paste; and drying the paste such that the water removal rate defined by Expression 1 is from 5 to 30% by weight, followed by calcination.

Yet another aspect of the present invention provides a method for producing a carbon nanotube aggregate, including: mixing a support with an aqueous solution of a graphitization metal catalyst precursor to form a paste; drying the paste to remove water, followed by calcination to obtain a supported catalyst; and bringing the supported catalyst into contact with a carbon-containing compound under heating to react with each other, wherein the water removal rate from the paste defined by Expression 1 is adjusted to 5 to 30% by weight to control the bulk density of the carbon nanotubes.

Effects of the Invention

The use of the supported catalyst according to the present invention can provide a carbon nanotube aggregate that has a high bulk density and is readily dispersible in and miscible with other materials, thus enabling the manufacture of a composite material with improved physical properties including the carbon nanotubes. As a result, the supported catalyst and the carbon nanotube aggregate containing the supported catalyst are suitable for use in various fields, such as energy materials, functional composites, pharmaceuticals, batteries, semiconductors, display devices, and manufacturing methods thereof.

DETAILED DESCRIPTION OF THE INVENTION

Figure 1:
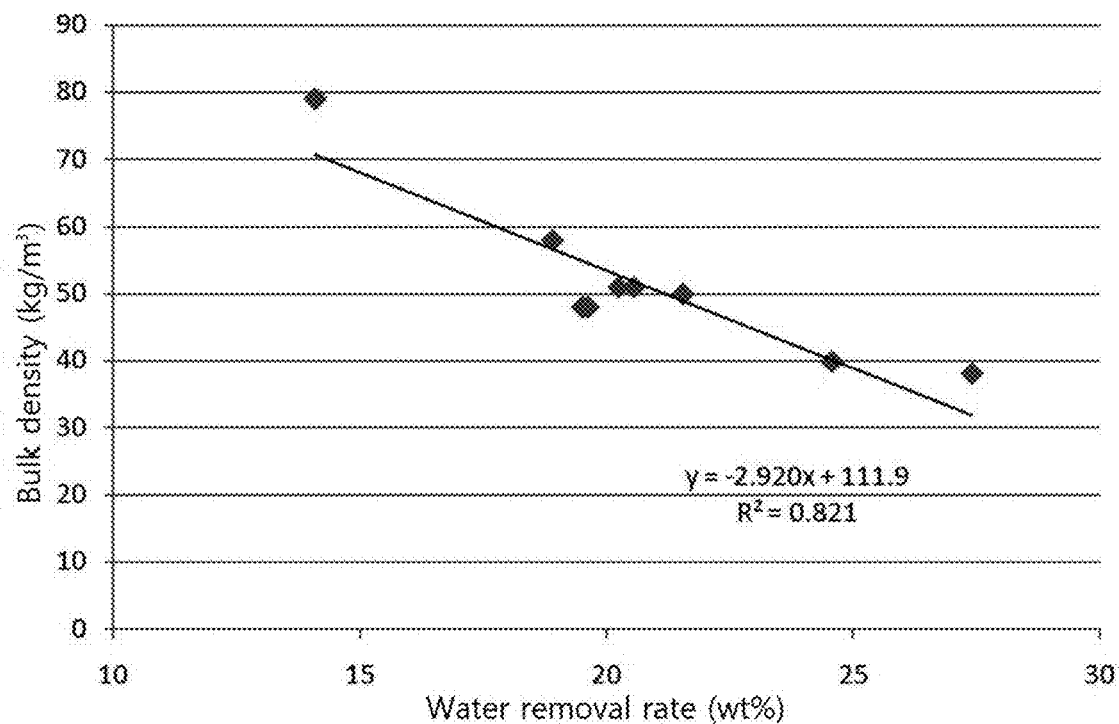
FIG. 1 is a graph showing the relationship between the bulk densities of carbon nanotube aggregates produced in Examples 1 to 9 and the water removal rates from pastes used in the production of the carbon nanotube aggregates.

The present invention will now be described in more detail.

The present invention provides a supported catalyst with excellent physical properties and a carbon nanotube aggregate grown from the supported catalyst by optimizing the processing steps, including pretreating a support, forming the supported catalyst, and/or forming the carbon nanotube aggregate.

According to one embodiment of the present invention, the supported catalyst may be prepared by mixing a support with an aqueous solution of a graphitization metal catalyst precursor to form a paste, drying the paste such that the water removal rate is from 5 to 30% by weight, and calcining the dried paste wherein the water removal rate is defined by Expression 1:

Water removal rate={[(the weight of the support+the weight of the metal catalyst precursor)−the weight of the paste after drying]/(the weight of the support+the weight of the metal catalyst precursor)}×100    (1)

where the weight of the metal catalyst precursor is determined by subtracting the weight of the water solvent from the weight of the aqueous solution of the metal catalyst precursor.

The present inventors have found that when the support as a solid is mixed with the aqueous solution of the metal precursor in the form of a hydrate to prepare the paste, followed by drying, the water solvent is fully removed and further water is removed from the paste, as revealed from the above expression.

According to a study conducted by the present inventors, the bulk density of the carbon nanotube aggregate produced using the supported catalyst varies depending on what extent the water is removed in the impregnation step during preparation of the supported catalyst. Depending on what extent the water is removed in the impregnation step, the impregnated metal species may exist in various forms in the support lattice, which is believed to affect the arrangement, size, etc. of the catalyst particles after calcination.

A precursor of the support used in the preparation of the supported catalyst serves to support the metal catalyst. As the support precursor, there may be used an aluminum-based support precursor, for example, aluminum trihydroxide (ATH). The support precursor may be pretreated by drying at about 50 to about 150° C. for about 1 to about 24 hours.

The support is formed by primary calcination of the support precursor. The first calcination temperature is preferably lower than 500° C. and is much lower than 700° C. known as the temperature at which aluminum trihydroxide is converted to alumina. The support, for example, the aluminum-based support, preferably includes at least 30% by weight of AlO(OH), which is converted from Al(OH)$_3$, but does not include Al$_2$O$_3$. Specifically, the primary calcination may include heat treatment at a temperature of about 100 to about 500° C. or about 200 to about 450° C.

The aluminum (Al)-based support may further include at least one metal oxide selected from the group consisting of ZrO$_2$, MgO, and SiO$_2$. The aluminum (Al)-based support may be spherical or potato-like in shape and may have a structure suitable to provide a relatively large surface area per unit weight or volume, such as a porous structure, a molecular sieve structure or a honeycomb structure. However, there is no particular restriction on the shape and structure of the aluminum (Al)-based support.

According to one embodiment, the support may have a particle diameter of about 20 to about 200 μm, a porosity of about 0.1 to about 1.0 cm$^3$/g, and a specific surface area smaller than about 1 m$^2$/g.

The primary calcination, by which the support is formed from the support precursor, may be performed for about 0.5 to about 10 hours, for example, about 1 to about 5 hours. However, no limitation is imposed on the primary calcination time.

The graphitization metal catalyst supported on the support may contain iron. The iron-containing graphitization metal catalyst plays a role in helping carbon components present in a carbon source in the gas phase bind to each other to form hexagonal ring structures.

The graphitization metal catalyst may use only iron. Alternatively, the graphitization metal catalyst may be a composite catalyst consisting of a main catalyst and an auxiliary catalyst. In this case, the main catalyst may include cobalt (Co) in addition to iron (Fe), and the auxiliary catalyst may be at least one metal selected from molybdenum (Mo) and vanadium (V). The auxiliary catalyst may be used in an amount ranging from about 0.1 to about 10 moles or from about 0.5 to about 5 moles, based on 10 moles of the main catalyst. For example, the composite catalyst may be selected from FeCo, FeCoMo, FeMoV, FeV, FeCoMoV, and combinations thereof.

The graphitization catalyst is supported in the form of a precursor, for example, a metal salt, a metal oxide or a metal compound, on the support. Examples of suitable precursors of the graphitization catalyst include water soluble Fe salts, Fe oxides, Fe compounds, Co salts, Co oxides, Co compounds, Mo oxides, Mo compounds, Mo salts, V oxides, V compounds, and V salts. Other examples include $Fe(NO_3)_2 \cdot 6H_2O$, $Fe(NO_3)_2 \cdot 9H_2O$, $Fe(NO_3)_3$, $Fe(OAc)_2$, $Co(NO_3)_2 \cdot 6H_2O$, $Co_2(CO)_8$, $[Co_2(CO)_6(t\text{-}BuC\equiv CH)]$, $Co(OAc)_2$, $(NH_4)_6Mo_7O_{24} \cdot 4H_2O$, $Mo(CO)_6$, $(NH_4)MoS_4$, and $NH_4VO_3$.

The precursor of the graphitization catalyst is supported in the form of a solution on the support, followed by secondary calcination. As a result of the secondary calcination, the precursor is usually supported in the form of a metal oxide in the supported catalyst.

For example, the supported catalyst may be prepared by the following procedure. First, the support (e.g., a granular aluminum-based support) obtained by the primary calcination is mixed with the aqueous solution of the graphitization catalyst precursor to form the paste. Then, the paste is dried under vacuum and secondarily calcined, for example, at a temperature of about 100° C. to about 700° C. to prepare the supported catalyst having a structure in which the surface and pores of the support are impregnated and coated with the graphitization catalyst components.

According to the present invention, the vacuum drying is performed such that the water removal rate is from 5 to 30% by weight, as defined by Expression 1:

Water removal rate={[(the weight of the support+the weight of the metal catalyst precursor)−the weight of the paste after drying]/(the weight of the support+the weight of the metal catalyst precursor)}×100     (1)

where the weight of the metal catalyst precursor is determined by subtracting the weight of the water solvent from the weight of the aqueous solution of the metal catalyst precursor.

According to one embodiment, the vacuum drying may be performed by rotary evaporation of the mixture of the aqueous solution of the graphitization catalyst precursor and the support under vacuum at a temperature ranging from about 40 to about 100° C. for a time ranging from about 30 minutes to about 12 hours.

According to one embodiment, the mixture may be aged with rotation or stirring at about 45 to about 80° C. before the vacuum drying. The aging may be performed, for example, for a maximum of 5 hours, 20 minutes to 5 hours or 1 to 4 hours.

The secondary calcination for the formation of the supported catalyst may be performed at a temperature of about 100° C. to about 700° C., for example, about 200° C. to about 700° C.

The paste is dried under vacuum to obtain a particulate material. The particulate material may have a particle diameter (or an average particle diameter) of about 30 to about 150 μm, as measured before the secondary calcination. Each of the granular support and the graphitization catalyst may have a spherical or potato-like shape with a primary particle diameter of about 10 to about 50 nm. Herein, the spherical or potato-like shape refers to a three-dimensional shape having an aspect ratio of 1.2 or less, such as a sphere or ellipse.

According to one embodiment, the amount of the graphitization catalyst may be in the range of about 5 to about 40% by weight, based on 100 parts by weight of the supported catalyst, but is not limited to this range.

According to one embodiment, the supported catalyst may have a structure in which the surface and pores of the granular support, preferably the aluminum-based support, are coated with a monolayer or multilayer of the graphitization catalyst.

The supported catalyst is preferably prepared by an impregnation method for the following reasons: the supported catalyst has a higher inherent bulk density than coprecipitated catalysts; unlike coprecipitated catalysts, the supported catalyst produces a small amount of a fine powder with a size of 10 microns or less, which reduces the possibility of occurrence of a fine powder due to attrition during fluidization; and high mechanical strength of the supported catalyst effectively stabilizes the operation of a fluidized bed reactor.

The supported catalyst containing the graphitization catalyst may be brought into contact with a carbon source in the gas phase under heating to produce the carbon nanotube aggregate. A detailed description will be given of the growth of carbon nanotubes. First, a carbonaceous material as the gas-phase carbon source is brought into contact with the graphitization catalyst supported in the supported catalyst, followed by heat treatment. As a result of the heat treatment, the carbonaceous material is thermally decomposed on the surface of the graphitization catalyst and carbon atoms formed from the carbon-containing gas as a result of the decomposition are infiltrated into and solubilized in the graphitization catalyst. If the amount of the carbon atoms infiltrated exceeds the solubility limit, an inherent feature of the graphitization catalyst, the carbon atoms form nuclei, which grow into carbon nanotubes.

According to one embodiment, the carbon nanotubes grown on the supported catalyst may have a bundle type structure. Due to this structure, the carbon nanotubes are readily dispersible in and miscible with polymers during compounding with the polymers.

Unless otherwise mentioned, the term "bundle type" used herein refers to a secondary shape of carbon nanotubes in which the carbon nanotubes are arranged in parallel or get entangled to form bundles or ropes, and the term "non-bundle or entangled type" refers to a type of carbon nanotubes that does not have a specific shape, such as a bundle- or rope-like shape.

The carbon nanotube aggregate of the present invention, which is produced using the supported catalyst, may have a bulk density of at least 30 $kg/m^3$, 30 to 100 $kg/m^3$, 30 to 90 $kg/m^3$, or 30 to 80 $kg/m^3$.

According to the present invention, the bulk density of the resulting carbon nanotubes increases as the water removal rate from the paste decreases in the impregnation step. Specifically, the water removal rate (x) and the bulk density (y) of the carbon nanotube aggregate satisfy the following relationship:

$$-2.9x+100 \leq y \leq -2.9x+130 \quad (2)$$

Based on this relationship, it is easy to control the bulk density of the carbon nanotube aggregate as desired.

Specifically, FIG. 1 is a graph showing the relationship between the bulk densities of carbon nanotube aggregates produced in the Examples section that follows and the water removal rates from pastes used in the production of the carbon nanotube aggregates. The relationship between the bulk density and the water removal rate shows that the form of the metal species present in the support lattice varies depending on what extent the water is removed, which is believed to affect the arrangement or size of the catalyst particles after calcination.

According to one embodiment of the present invention, the bundle type carbon nanotubes may be produced by primarily calcining the support precursor at a primary calcination temperature, for example, at a temperature of 100 to 500° C., to obtain the support, supporting an iron-containing graphitization catalyst on the support, secondarily calcining the catalyst-containing support at a temperature of 100 to 700° C. to prepare the supported catalyst, and bringing the supported catalyst into contact with a carbon source in the gas phase.

The use of the supported catalyst allows for growth of the carbon nanotubes by chemical vapor synthesis through decomposition of the carbon source, leading to the production of the carbon nanotube aggregate.

According to the chemical vapor synthesis, the iron-containing graphitization catalyst is charged into a reactor and the carbon source in the gas phase is then supplied to the reactor at ambient pressure and high temperature to produce the carbon nanotube aggregate in which the carbon nanotubes are grown on the supported catalyst. As described above, the carbon nanotubes are grown by thermal decomposition of a hydrocarbon as the carbon source. The thermally decomposed hydrocarbon is infiltrated into and saturated in the graphitization catalyst and carbon is deposited from the saturated graphitization catalyst to form hexagonal ring structures.

The chemical vapor synthesis can be performed in such a manner that the supported catalyst is fed into a horizontal fixed bed reactor or fluidized bed reactor and at least one carbon source selected from $C_1$-$C_6$ saturated or unsaturated hydrocarbons, and optionally together with a mixed gas of a reducing gas (e.g., hydrogen) and a carrier gas (e.g., nitrogen) is introduced into the reactor at a temperature of from a temperature equal to or higher than the thermal decomposition temperature of the carbon source in the gas phase to a temperature equal to or lower than the melting point of the graphitization catalyst, for example, at a temperature of about 500 to about 900° C., about 600 to 750° C. or about 660 to about 690° C. Carbon nanotubes may be grown for 30 minutes to 8 hours after the carbon source is introduced into the supported catalyst.

The type of a heat source for the calcination or heat treatment in the method is not limited and may be, for example, induction heating, radiant heating, laser, IR, microwave, plasma, UV or surface plasmon heating.

Any carbon source that can supply carbon and can exist in the gas phase at a temperature of 300° C. or more may be used without particular limitation for the chemical vapor synthesis. The gas-phase carbonaceous material may be any carbon-containing compound but is preferably a compound consisting of up to 6 carbon atoms, more preferably a compound consisting of up to 4 carbon atoms. Examples of such gas-phase carbonaceous materials include, but are not limited to, carbon monoxide, methane, ethane, ethylene, ethanol, acetylene, propane, propylene, butane, butadiene, pentane, pentene, cyclopentadiene, hexane, cyclohexane, benzene, and toluene. These gas-phase carbonaceous materials may be used alone or as a mixture thereof. The mixed gas of hydrogen and nitrogen transports the carbon source, prevents carbon nanotubes from burning at high temperature, and assists in the decomposition of the carbon source.

The gas-phase carbon source, hydrogen, and nitrogen may be used in various volume ratios, for example, 1:0.1-10:0-10 or 1:0.5-1.5:0.5-1.5. The flow rate of the reaction gases may be in the range of about 100 to about 500 sccm.

After growth of the carbon nanotubes by the heat treatment at high temperature, the carbon nanotubes are cooled. This cooling ensures more regular alignment of the carbon nanotubes. The carbon nanotubes may be naturally cooled (i.e. by removal of the heat source) or may be cooled at a rate of about 5 to about 30° C./min.

The carbon nanotubes thus produced are of a bundle type and have a BET specific surface area of at least about 150 $m^2/g$, preferably about 200 $m^2/g$ to about 500 $m^2/g$. The specific surface area can be measured by the BET method.

Particularly, the method enables the production of the carbon nanotube aggregate in high yield, for example, about 5 times to about 50 times or about 10 times to 40 times. The yield of the carbon nanotube aggregate can be determined by measuring the content of the carbon nanotubes obtained at room temperature using an electronic scale. The reaction yield can be calculated by substituting the weight of the supported catalyst used and the total weight after the reaction into the following expression:

Yield of carbon nanotube aggregate (times)=(the total weight after the reaction (g)–the weight of the supported catalyst used (g))/the weight of the supported catalyst used (g)

The carbon nanotube aggregate may be of a bundle type with an aspect ratio of about 0.9 to about 1. In addition, the carbon nanotubes may have a strand diameter of about 2 nm to about 20 nm, preferably about 3 nm to about 8 nm. The strand diameter of the carbon nanotubes decreases with increasing BET specific surface area.

The aspect ratio can be defined by the following expression:

Aspect ratio=the shortest diameter passing through the center of carbon nanotube/the longest diameter passing through the center of carbon nanotube As described above, the carbon nanotube aggregate has a large BET specific surface area, i.e. a small diameter, and is of a bundle type. Based on such characteristics, the carbon nanotube aggregate is readily dispersible in and miscible with other materials, for example, polymers, and can thus be used to manufacture composite materials with improved physical properties.

Therefore, the carbon nanotube aggregate is suitable for use in various display devices, such as LCDs, OLEDs, PDPs, and e-papers, electrode structures, such as solar cells, fuel cells, lithium batteries, and supercapacitors, functional composite materials, energy materials, pharmaceuticals, and semiconductors, such as FETs.

The following examples are provided to assist in understanding the invention. However, it will be obvious to those skilled in the art that these examples are merely illustrative and various modifications and changes are possible without departing from the scope and spirit of the invention. Accordingly, it should be understood that such modifications and changes are encompassed within the scope of the appended claims.

Example 1

A. Preparation of Aqueous Solution of Graphitization Metal Catalyst Precursor 2,424 g of $Fe(NO_3)_2 \cdot 6H_2O$, a precursor of Fe as a graphitization catalyst, was added to 2,000 g of water. The aqueous metal solution was observed to be clear and free of precipitates.

B. Preparation of Support

Aluminum trihydroxide ($Al(OH)_3$, ATH) as an aluminum-based support was primarily calcined at 400° C. for 4 h to obtain a support (ATH400). 2,000 g of the support was placed in flask B. XRD analysis revealed the presence of 40 wt % or more of AlO(OH) in the support.

C. Preparation of Supported Catalyst 4,424 g of the solution in flask A was added to flask B such that the number of moles of Fe was 30 moles when the number of moles of ATH400 (2,000 g) was assumed to be 100 moles. The mixture was weighed and aged with stirring in a thermostatic bath at 60° C. for 5 min to sufficiently support the graphitization metal catalyst precursor on ATH400. The aged graphitization catalyst supported on the support was rotated at 80 rpm and dried under vacuum while maintaining the temperature. The dried catalyst was weighed to calculate the amount of water removed (ca. 14.1%). The dried catalyst was secondarily calcined at 600° C. for 4 h to prepare a supported catalyst.

D. Synthesis of Carbon Nanotube Aggregate

Carbon nanotubes were synthesized using the supported catalyst in a fixed bed reactor on a laboratory scale.

Figure 2:
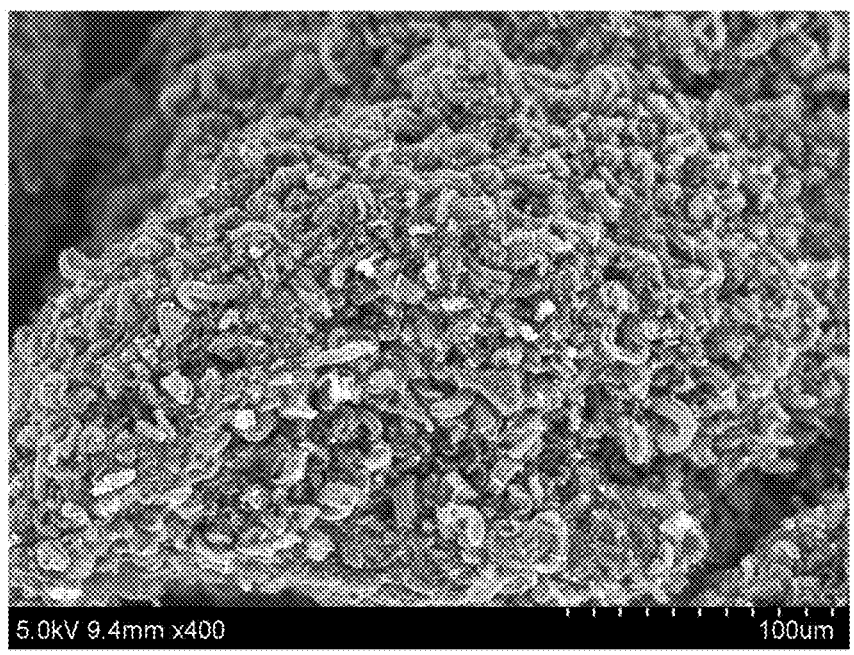
FIGS. 2 and 3 show SEM images of bundle type carbon nanotubes obtained in Example 1.
Figure 3:
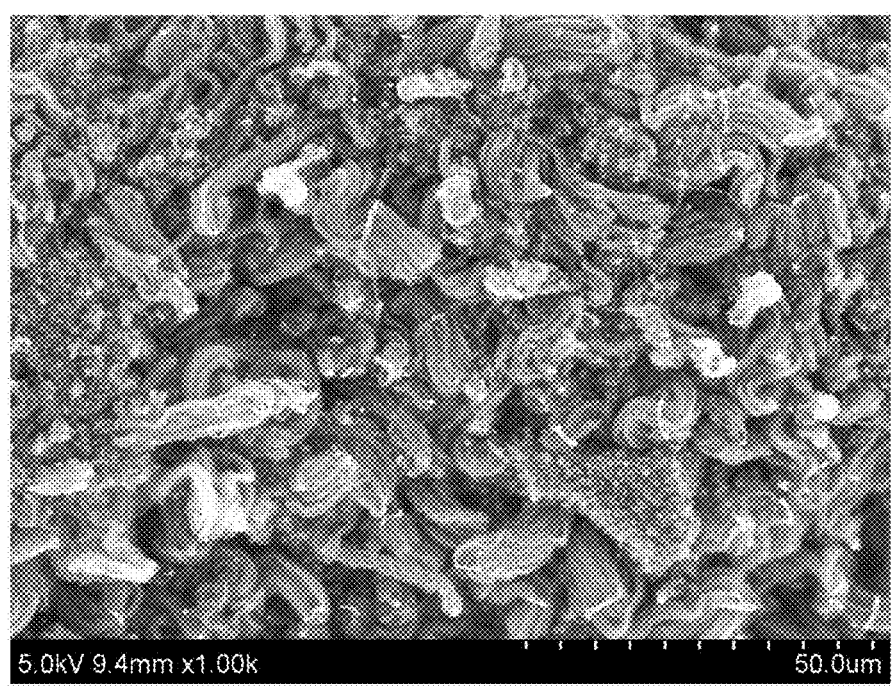

Specifically, the supported catalyst was mounted at the center of a quartz tube having an inner diameter of 55 mm and heated to 670° C. under a nitrogen atmosphere. A mixed gas of nitrogen, hydrogen and ethylene gas in the same volumes was allowed to flow at a rate of 180 ml/min for a total of 1 h while maintaining the same temperature, affording a carbon nanotube aggregate. FIGS. 2 and 3 show SEM images of the carbon nanotube aggregate.

Examples 2 to 9

Catalysts were prepared in the same manner as in Example 1, except that the water removal rate was changed as shown in Table 1. Carbon nanotube aggregates were synthesized using the catalysts in the same manner as in Example 1.

The bulk densities of the carbon nanotube aggregates synthesized in Examples 1-9 were measured. The results are shown in Table 1.

TABLE 1

| Example No. | Support + metal catalyst precursor (g) | Water removed (g) | Water removal rate (wt %) | Bulk density (kg/m$^3$) | Yield (%) |
|---|---|---|---|---|---|
| 1 | 4424 | 624 | 14.1 | 79 | 200 |
| 2 | 4424 | 863.76 | 19.52 | 48 | 303 |
| 3 | 4424 | 1212.58 | 27.41 | 38 | 296 |
| 4 | 4424 | 894.82 | 20.23 | 51 | 463 |
| 5 | 4424 | 836.06 | 19.62 | 48 | 377 |
| 6 | 4424 | 836.38 | 18.91 | 58 | 468 |
| 7 | 4424 | 953.38 | 21.55 | 50 | 400 |
| 8 | 4424 | 909.58 | 20.56 | 51 | 447 |
| 9 | 2090 | 513.47 | 24.57 | 39.8 | 403 |

In Table 1, the water removal rate was calculated by Expression 1:

Water removal rate={[(the weight of the support+the weight of the metal catalyst precursor)−the weight of the paste after drying]/(the weight of the support+the weight of the metal catalyst precursor)}×100   (1)

where the weight of the metal catalyst precursor is determined by subtracting the weight of the water solvent from the weight of the aqueous solution of the metal catalyst precursor.

From the results in Table 1, it can be seen that the water removal rate (x) and the bulk density (y) satisfy following relationship:

$$-2.9x+100 \leq y \leq -2.9x+130 \quad (2)$$

Based on this relationship, the water removal rate from each paste is simply adjusted in the impregnation step during preparation of the supported catalyst, so that the bulk density of the carbon nanotube aggregate can be easily controlled.

What is claimed is:

1. A method for producing a carbon nanotube aggregate, comprising:
    mixing a support with an aqueous solution of a graphitization metal catalyst precursor to form a paste;
    drying the paste at a temperature ranging from 40° C. to 100° C. under vacuum to remove water at a water removal amount of 5 to 30% by weight to control the bulk density of the carbon nanotubes, the water removal amount being defined by Expression 1:

Water removal amount={[(the weight of the support+the weight of the metal catalyst precursor)−the weight of the paste after drying]/(the weight of the support+the weight of the metal catalyst precursor)}×100 where the weight of the metal catalyst precursor is determined by subtracting the weight of the water solvent from the weight of the aqueous solution of the metal catalyst precursor,
    followed by calcination to obtain a supported catalyst; and
    bringing the supported catalyst into contact with a carbon-containing compound under heating to react with each other,
    wherein the water removal amount (x; wt %) and the bulk density (y; kg/m$^3$) of the carbon nanotube aggregate satisfy the following relationship:

$-2.9x+100 \leq y \leq -2.9x+130$.

2. The method according to claim 1, wherein the bulk density of the carbon nanotube aggregate increases as the water removal rate decreases.

3. The method according to claim 1, wherein the carbon nanotubes are of a bundle type.

4. The method according to claim 1, wherein the bulk density of the carbon nanotube aggregate is at least 30 kg/m$^3$.

5. The method according to claim 1, wherein the carbon-containing compound is selected from the group consisting of carbon monoxide, methane, ethane, ethylene, ethanol, acetylene, propane, propylene, butane, butadiene, pentane, pentene, cyclopentadiene, hexane, cyclohexane, benzene, toluene, and mixtures thereof.

6. The method according to claim 1, wherein the supported catalyst reacts with the carbon-containing compound at a temperature equal to or higher than the thermal decomposition temperature of the carbon-containing compound to the melting point of the supported catalyst.

7. The method according to claim 1, wherein the support is based on aluminum.

8. The method according to claim 1, wherein the support is obtained from aluminum trihydroxide (Al(OH)$_3$) as a precursor.

9. The method according to claim 1, wherein the supported catalyst is an iron (Fe)-containing graphitization catalyst.

10. The method according to claim 1, wherein the support is obtained by calcination of a support precursor at a temperature of 100 to 500° C.

11. The method according to claim 1, wherein the dried paste is calcined at a temperature of 100° C. to 700° C.

12. The method according to claim 1, wherein the graphitization catalyst is a unitary catalyst containing only iron (Fe) or a binary or multi-component catalyst comprising one or more metals selected from cobalt (Co), molybdenum (Mo), or vanadium (V).

13. The method according to claim 1, wherein the amount of the metal catalyst is from 5 to 40% by weight, based on 100 parts by weight of the supported catalyst.

14. The method according to claim 1, wherein the water removal amount is 14.1 to 27.41% by weight.

15. The method according to claim 1, wherein drying the paste is carried out at a temperature of 60° C.

* * * * *